United States Patent [19]

Baker

[11] 4,041,269
[45] Aug. 9, 1977

[54] CARTRIDGE FOR AN ELECTRICAL DISCHARGE MACHINING APPARATUS

[75] Inventor: George Edward Baker, Asfordby, near Melton Mowbray, England

[73] Assignee: Amchem Company Limited, England

[21] Appl. No.: 666,916

[22] Filed: Mar. 15, 1976

[30] Foreign Application Priority Data

Mar. 15, 1975 United Kingdom ............... 10908/75

[51] Int. Cl.² .............................................. B23P 1/08
[52] U.S. Cl. .................................................. 219/69 E
[58] Field of Search ............. 219/69 E, 69 G, 131 F, 219/139, 136; 204/222, 225; 226/162–166; 13/14–17

[56] References Cited

U.S. PATENT DOCUMENTS

| | | | |
|---|---|---|---|
| 3,098,148 | 7/1963 | Piot et al. | 219/69 E |
| 3,729,609 | 4/1973 | Check et al. | 219/69 G |
| 3,981,786 | 9/1976 | Andrews | 219/69 E |

Primary Examiner—Bruce A. Reynolds
Attorney, Agent, or Firm—Diller, Brown, Ramik & Wight

[57] ABSTRACT

This invention discloses a cartridge for containing electrodes which are fed to the nose guide of an electrical discharge machining apparatus. The cartridge has a carriage which contains the electrodes and moves with respect to the nose guide. An electrode clamp is provided to lock the electrodes in position in the cartridge together with means offering frictional resistance to sliding movement of the electrodes upon release of the clamp.

11 Claims, 5 Drawing Figures

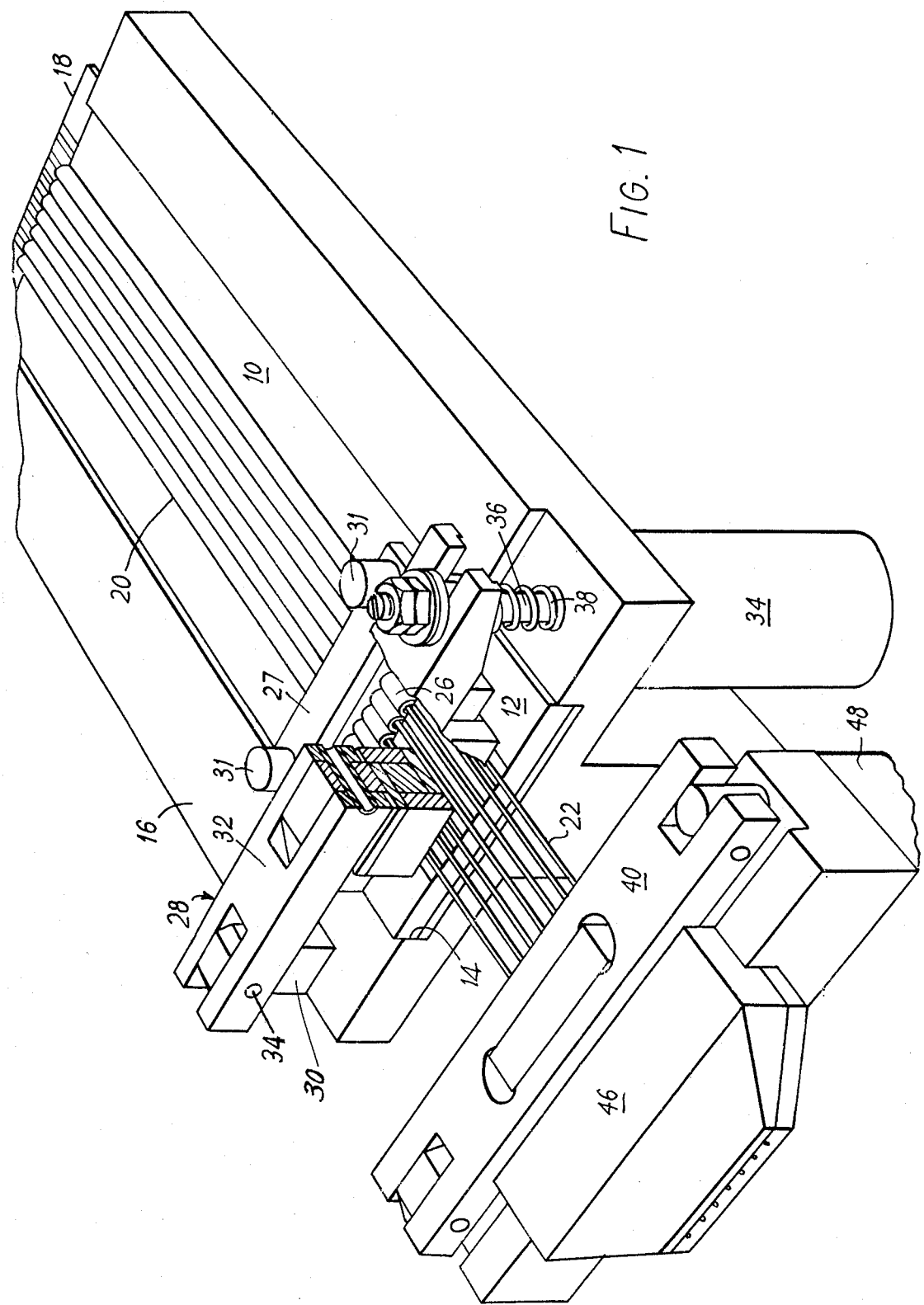

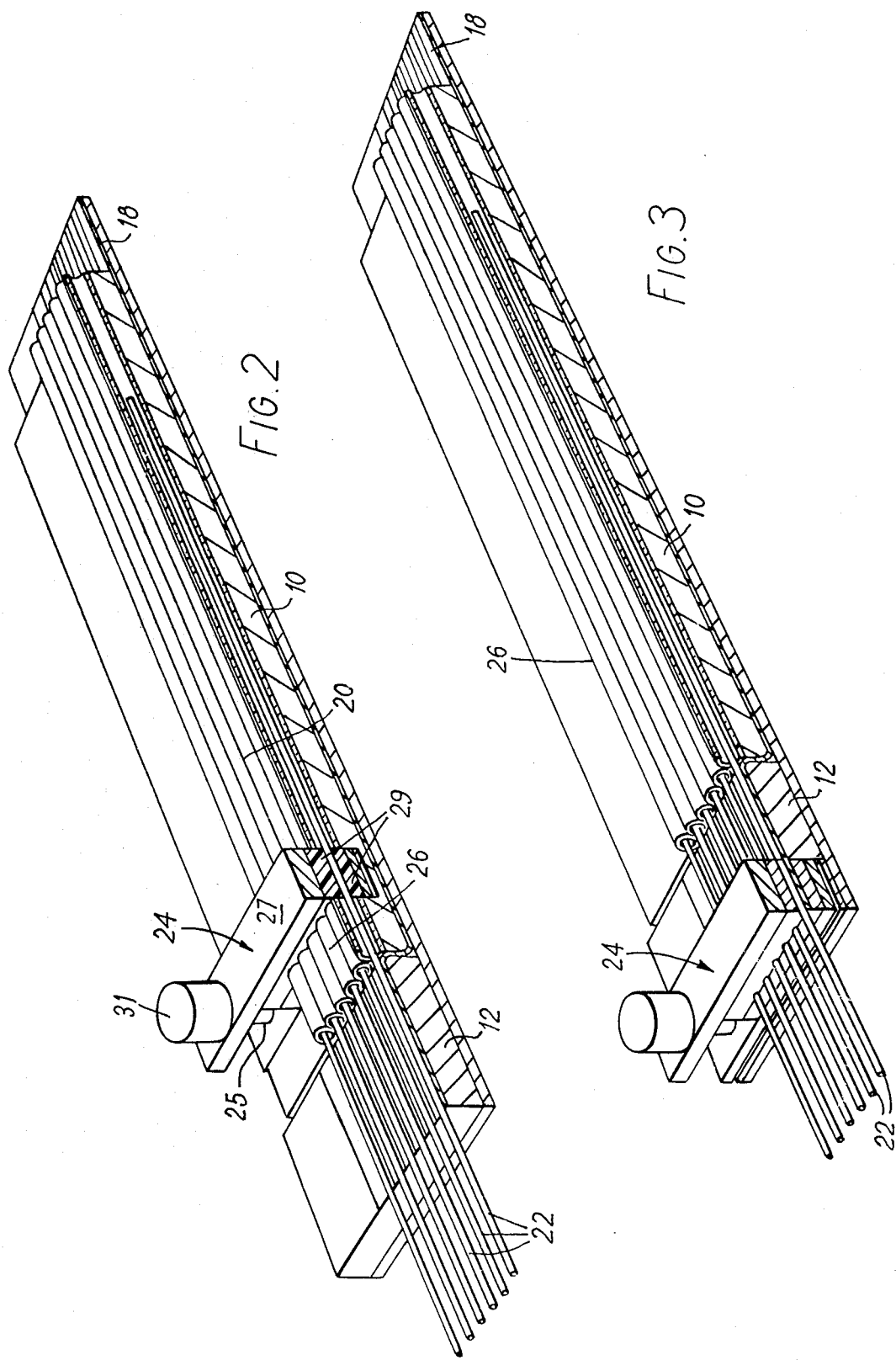

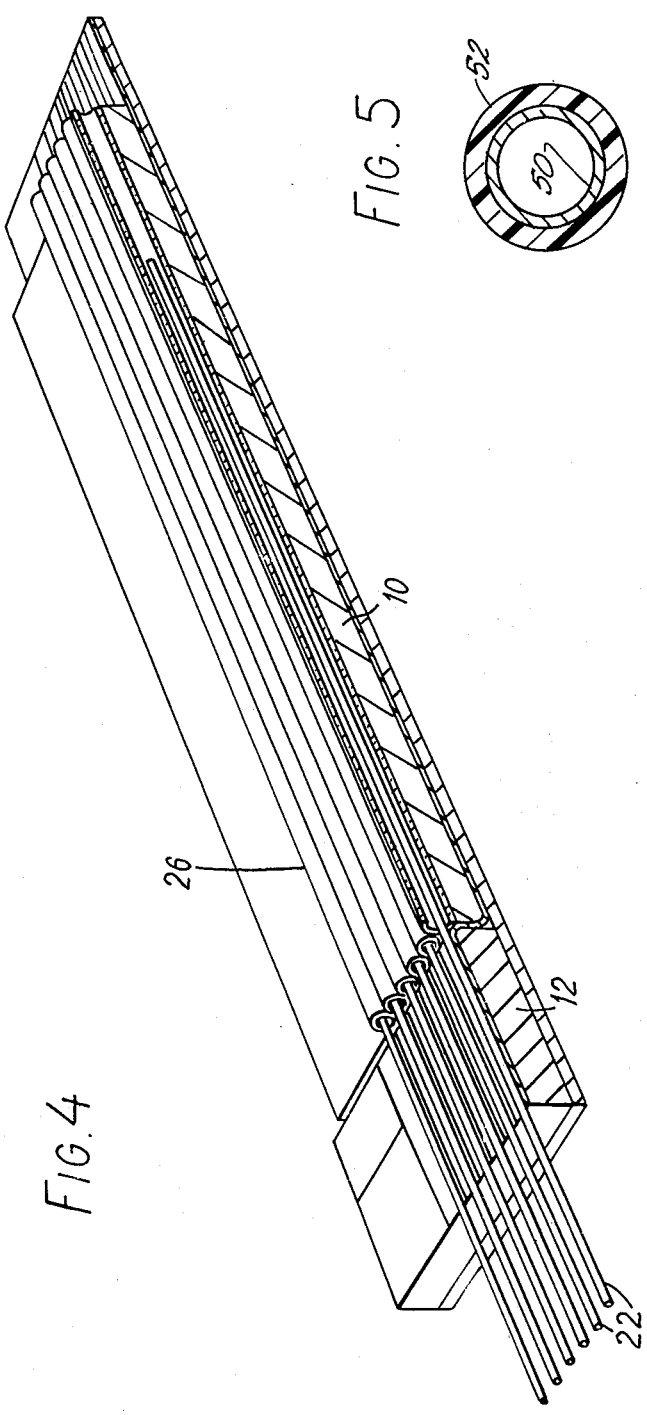

CARTRIDGE FOR AN ELECTRICAL DISCHARGE MACHINING APPARATUS

The present invention relates to a cartridge for electrical discharge machining apparatus and in particular to a cartridge for holding a plurality of electrodes.

Electrical discharge machining depends upon the very high temperature of a spark to melt material, such as metal, from the surface of a workpiece. The sparks are produced at a high rate (typically 15,000 to 30,000 per second) by either a resistance-capacitance electrical system or a rotary impulse generator.

Hitherto it has been proposed to produce a plurality of coincident sparks from mutually insulated electrodes to enable a common workpiece to be machined simultaneously by all the electrodes. In one known arrangement the electrodes are fixed to a common electrode block. Since the electrodes wear unevenly however after a relatively short period, unsatisfactory machining results so that the whole electrode block needs to be fitted with new electrodes.

A further known arrangement is disclosed in U.K. Pat. Specification No. 1,366,397 which discloses a grooved cartridge assembly for holding a plurality of electrodes, the cartridge assembly including electrode guide means which guide the electrodes to the machining position. One disadvantage of this arrangement is that the grooving is expensive to machine and difficulties may be created by the fact that the guide means form part of the cartridge assembly.

The carriage is conveniently in the form of a grooved slide having an assembly, on which the tubes are mounted, removably-received in the groove. The assembly is preferably formed from two plates, a first of which is arranged to support the electrode tubes and the second of which, adjacent the nose of the electrical discharge machining apparatus, is arranged to support the electrodes alone. The second plate is preferably raised with respect to the first plate by an amount corresponding to the wall thickness of the tubes.

The first plate is conveniently of perspex (a transparent plastics material having insulating properties) or glass and the tubes are preferably bonded to the first plate by an adhesive.

In a preferred embodiment of the invention the tubes are formed in two sections, a roughly machined section at the end of the carriage remote from the nose guide and an accurately machined section at the end of the carriage adjacent the nose guide, the means offering frictional resistance against sliding electrode movement being arranged between the two tube sections.

The means offering frictional resistance against sliding electrode movement may take the form of a pair of spaced studs between which a clamp plate is adjustably supported and which is engageable with the electrodes in the cartridge, the facing surfaces of the clamp plate and the carriage being surfaced with a frictional material, means being provided for bringing the clamp plate closer to the carriage to thereby increase the frictional resistance upon the electrodes.

Appropriate electrical connection may be made to the electrodes at a position remote from the cartridge. It is preferred however that a printed circuit board is secured to the reverse side of said first plate of the carriage, the board conductors being arranged to pass between said two plates and up onto the surface of the second plate so as to lie in parallely spaced relation in alignment with the electrodes to permit electrical connection thereto.

In accordance with another aspect of the present invention there is provided a cartridge for an electrical discharge machining apparatus comprising a carriage mounted for sliding movement with respect to a nose guide of the electrical discharge machining apparatus, a plurality of parallel tubes being mounted on the carriage, the tubes being capable of each receiving an electrode as a sliding fit and guiding the electrodes towards said nose guide on the electrical discharge machining apparatus, and clamp means including means operable to lock the electrodes in a fixed position within the cartridge, and means offering frictional resistance against sliding electrode movement within said tubes.

Although it is preferred that the tubes are composed entirely of an electrically insulated material, they may include an inner metallic tube which includes a coating or layer of an electrically insulating resin. The inner metallic tube may be of stainless steel, and the outer layer or coating of a resin, a plasma coating or paint. If desired, the layer or coating may be a sleeve of a shrink fitting material which, when heated, forms a shrink wrapping for a tube. The invention will now be described with reference to the accompanying drawings in which:-

FIG. 1 is a perspective view of a cartridge in accordance with a preferred embodiment of the invention in position upon an electrical discharge machining apparatus, FIG. 2 is a perspective view partly in section of part of the cartridge of FIG. 1, FIG. 3 illustrates part of a cartridge in accordance with a second embodiment of the invention, FIG. 4 illustrates part of a cartridge in accordance with a third embodiment of the invention, and FIG. 5 is a cross-sectional view of electrode-receiving tube.

The cartridge illustrated in FIG. 1 consists of an aluminium slide 16 which is mounted for reciprocal movement with respect to a nose guide 46 of an electrical discharge machining apparatus. The slide 16 includes a longitudinally extending groove 14 in which an assembly for carrying machining electrodes is removably received.

The assembly, which may be best seen from FIG. 2, consists of two perspex (a transparent plastics material having insulated properties) plates 10 and 12, the top surfaces of which are slightly stepped. A plurality of parallel glass tubes are bonded to the plate 10 in two tube sections. The first section, at a position remote from the nose guide 46 includes a plurality of roughly machined tubes 20, the second section being spaced from the first section and including a plurality of accurately machined glass tubes 26.

Means offering frictional resistance to the passage of electrodes through the tubes is arranged between the two tube sections. In the illustrated embodiment the means comprises a friction pad device shown generally as 24. The pad includes a pair of spaced studs 25 between which a clamp plate 27 is adjustably supported by means of knurled nuts 31. The facing surfaces of the clamp plate 27 and that of the plate 10 opposite thereto are surfaced with a friction material 29. It may thus be seen that when electrodes 22 pass between the two layers of frictional material 29 the frictional pressure exerted on the electrodes may be adjusted as required by turning the knurled nuts 31.

A printed circuit board 18, having appropriate electrical connections thereto, (not shown) is mounted in the groove 14 below the plate 10 and 12, the board conductors lying below the plate 10, but passing between the plates so that they lie in parallely spaced relationship on the plate 12. The spacing of the conductors is such that an electrode 22 emerging from the glass tubes passes over a respective conductor to make electrical contact therewith as may be clearly seen from FIG. 2. Thus the plate 12 is stepped up relative to the plate 10 by an amounting corresponding to the wall thickness of the tubes 26.

As may be seen from FIG. 1 the cartridge is arranged for positioning in an electrical discharge machining apparatus so that the electrodes emerging from the glass tubes pass through the nose guide 46 of the electrical discharge machining apparatus. It will be appreciated that there is no physical connection between the cartridge and the nose guide other than by way of the electrodes themselves, and that accordingly the nose guide does not form part of the present invention.

A clamping pad, shown generally as 28 in FIG. 1 is mounted on the slide 16 and includes a post 30 which pivotally mounts an arm 32 at a pivot 34. The free end of the arm 32 is bifurcated and receives the piston rod 36 of a single-acting hydraulic cylinder 34. A helical spring 38 mounted around the rod 36 is arranged to normally clamp the electrodes but this pressure may be released by actuation of the hydraulic cylinder 34 when it is desired to feed the electrodes through the cartridge.

A further clamp 40, which does not form part of the present invention, is mounted adjacent the nose 46 and is normally in a released condition. The clamp 40 may be actuated however to clamp the electrodes by actuation of any hydraulic cylinder 48.

In operation the electrodes are manually inserted in the glass tubes and caused to pass through the various clamps and into the nose guide 46. The ends of the electrodes are located in position upon a workpiece surface, the clamp 28 then being operated so as to clamp the electrodes in that position. Machining is then effected in known manner with a dielectric fluid such as ionized water or paraffin being caused to pass through the nose 46 through apertures (not shown) and then caused to drip down the electrodes on to the workpiece being machined.

After machining has been completed the clamp 28 and the carriage is indexed forward so as to close the gap between the cartridge and the nose guide 46. At the same time, because of the frictional resistance created by the friction pad device 24, the electrodes 22 are forced forward and on to the surface of a workpiece to be machined. Once the electrodes have touched that surface however continued forward movement of the carriage overcomes the frictional resistance of the friction pad device 24 so that the electrodes 22 remain stationary until the carriage completes its forward movement. Thus, any continued forward movement of the carriage is accommodated by the electrodes being received back into the tubes.

It will be appreciated that a distinct advantage of the above described cartridge is that the roughly machined tubes 20 approximately align the electrodes 22 and that the finely machined tubes 26 accurately align them. Thus only a comparatively short length of the expensive finely machined tubes 26 need be used.

Operation of the control functions of the apparatus including movement of the slide 16, actuation of the clamps 32 and 40 and of the supply of electric power and dielectric coolant is controlled by means of a control apparatus (not shown) which is of known construction and does not form a part of the invention.

The embodiments of the invention illustrated in FIGS. 3 and 4 operate in a similar manner to that of FIGS. 1 and 2 in that they include an assembly which is removably mountable in the groove 14 of a slide 16.

In the embodiment of FIG. 3 the finely machined tubes 26 extend the full length of the plate 10 and the friction pad device 24 is arranged at the end of the plate 12 adjacent the nose 46.

In the embodiment of FIG. 4 the finely machined tubes 26 again extend the whole length of the cartridge but no separate friction pad device 24 is provided. In this embodiment of the invention a friction pad is mounted within the clamp 28 so that even when the clamp 28 is released there is still frictional resistance to the movement of the electrodes.

The electrodes 22 may be of any electrically conductive material, graphite or copper being preferred. The graphite may be resin-bonded and moulded to appropriate dimensions. Where copper electrodes are used they may be copper electro-plated onto a base material.

Although, for safety reasons, the tubes described herein are made from an electrically insulating material such as glass or perspex, they may equally be made from a conducting material for example, a metal, such as stainless steel but having a coating or layer of an electrically insulating material applied thereto.

Thus, in FIG. 5 the electrode-receiving tube shown consists of a stainless steel tube 50 to which a coating of an electrically-insulating resin 52 is applied. The coating 52 may be a paint, a plasma coating or a shrink-wrapped sleeve.

It will be apparent to those skilled in the art that various modifications and improvements may be resorted to without departing from the spirit and scope of the invention as set forth in the appended claims.

I claim:

1. A cartridge for an electrical discharge machining apparatus having an electrode nose guide, said cartridge comprising a carriage in the form of a grooved slide having a groove and mounted for sliding movement with respect to said nose guide, an assembly removably received in said groove, a plurality of parallel tubes being mounted on said assembly and insulated one from the other and from the assembly, said tubes being capable of each receiving an electrode as a sliding fit and guiding the electrodes towards said nose guide, said assembly including two supports which are stepped one relative to the other, a first of said supports supporting said electrode tubes and a second of said supports, which second support lies adjacent said nose guide, supporting the electrodes alone, clamp means mounted upon said carriage and including means operable to lock said electrodes in a fixed position within said cartridge, and means mounted upon said carriage and offering frictional resistance against sliding electrode movement within said tubes.

2. A cartridge as set forth in claim 1, wherein the second support is raised with respect to the first support by an amount corresponding to the wall thickness of the tubes.

3. A cartridge as set forth in claim 2 wherein said tubes are bonded to said first support by an adhesive.

4. A cartridge as set forth in claim 3 wherein said tubes are of glass.

5. A cartridge as set forth in claim 1 wherein the means offering frictional resistance against sliding electrode movement comprises a pair of spaced studs, a clamp plate being adjustably supported between said spaced studs and being engageable with the electrodes in the cartridge, the facing surfaces of the clamp plate and the carriage being surfaced with a frictional material, means being provided for bringing the clamp plate closer to the carriage to thereby increase the frictional resistance upon the electrodes.

6. A cartridge as set forth in claim 1 wherein a printed circuit board is secured to the reverse side of said first support of the carriage, the board conductors passing between said first and second supports and onto a surface of said second support so as to lie in parallel spaced relation in alignment with the electrodes to permit electrical connection thereto.

7. A cartridge as set forth in claim 1 wherein each of said tubes comprise an inner tube of a conducting material to which a layer of an electrically insulating material is applied.

8. A cartridge as set forth in claim 7 wherein said inner tube is composed of stainless steel.

9. A cartridge as set forth in claim 7 wherein said layer of electrically insulating material is selected from a resin, plasma coating, paint and a shrink-fitted sleeve.

10. A cartridge for an electrical discharge machining apparatus having an electrode nose guide, said cartridge comprising a carriage mounted for sliding movement with respect to said nose guide,
 a plurality of parallel tubes made from an electrically insulating material being mounted on said carriage, said tubes being capable of each receiving an electrode as a sliding fit and guiding the electrodes towards said nose guide,
 clamp means mounted upon said carriage and including means operable to lock said electrodes in a fixed position within the cartridge,
 and means mounted upon said carriage and offering frictional resistance against sliding electrode movement within said tubes, said tubes being formed in two sections including a roughly machined section at the end of the carriage remote from said nose guide and an accurately machined section adjacent said nose guide.

11. A cartridge as set forth in claim 10 wherein said means offering frictional resistance against sliding electrode movement is disposed between the two tube sections.

* * * * *